United States Patent [19]
Shibata

[11] Patent Number: 5,803,999
[45] Date of Patent: Sep. 8, 1998

[54] PNEUMATIC RADIAL TIRE WITH SPECIFIED TREAD PROFILE

[75] Inventor: Kouji Shibata, Nishinomiya, Japan

[73] Assignee: Sumitomo Rubber Industries, Ltd., Hyogo-ken, Japan

[21] Appl. No.: 785,769

[22] Filed: Jan. 21, 1997

[30] Foreign Application Priority Data

Feb. 14, 1996 [JP] Japan .................................... 8-026716
Nov. 21, 1996 [JP] Japan .................................... 8-310939

[51] Int. Cl.⁶ .............................. B60C 3/00; B60C 11/00; B60C 11/01
[52] U.S. Cl. ...................... 152/209 R; 152/454; 152/531
[58] Field of Search ................ 152/454, 209 R, 152/531

[56] References Cited

U.S. PATENT DOCUMENTS

| | | | |
|---|---|---|---|
| 5,117,886 | 6/1992 | Tokutake | 152/454 |
| 5,222,537 | 6/1993 | Saito et al. | 152/454 X |
| 5,238,038 | 8/1993 | Glover et al. | 152/454 X |
| 5,247,979 | 9/1993 | Asano | 152/454 X |

FOREIGN PATENT DOCUMENTS

| | | | |
|---|---|---|---|
| 0 402 303 | 12/1990 | European Pat. Off. | 152/454 |
| 0 477 542 | 4/1992 | European Pat. Off. | 152/209 R |
| 3-121905 | 5/1991 | Japan | 152/209 R |
| 4-87802 | 3/1992 | Japan | 152/454 |
| 5-229308 | 9/1993 | Japan | 152/454 |
| 6-48116 | 2/1994 | Japan | 152/209 R |
| 6-48117 | 2/1994 | Japan | 152/209 R |
| 6-71655 | 3/1994 | Japan | 152/209 R |
| 6-297912 | 10/1994 | Japan | 152/209 R |

OTHER PUBLICATIONS

Patent Abstracts of Japan vol. 12, No. 183 (M–703), 28 May 1988 & JP 62–295702 A (Sumitono Rubber Ind. Ltd.), 23 Dec. 1987.

*Primary Examiner*—Adrienne C. Johnstone
*Attorney, Agent, or Firm*—Birch, Stewart, Kolasch & Birch, LLP

[57] ABSTRACT

A pneumatic radial tire has a tread profile comprising a curved crown part having a radius of curvature R1, a pair of curbed middle parts having a radius of curvature R2 and a pair of curved shoulder parts having a radius of curvature R3 which extend continuously without forming any inflection point, wherein the radius R1 is in the range of from 2.0 to 3.5 times the tread width TW and is less than the radius R2 and more than the radius R3, and the camber quantity T1 which is the radial distance of the tread profile at the tread edges from the tread profile at the tire equator is 0.038 to 0.050 times the tread width TW.

4 Claims, 4 Drawing Sheets

PNEUMATIC RADIAL TIRE WITH SPECIFIED TREAD PROFILE

BACKGROUND OF THE INVENTION

The present invention relates to a pneumatic radial tires which can reduce the noise generated from the tire when changing road levels.

As concrete roads age and settle, the joints between road sections define relatively large differences in road level. For example, in a freeway in North America, as shown in FIG. 5, a road level difference (x) of 5 to 8 mm repeats itself every joint span (y) having a length of about 4.6 to 4.8 m. Therefore, when automobiles traverse the road level differences at high speed, the tires generate an uncomfortable sound (hereinafter called "go-down") at short intervals and at a relatively high sound pressure level.

The frequency spectrum of such a pulsive "go-down" noise has three peaks at about 80, 250 and 750 Hz. If the individual pulsive sound is heard through a band-pass filter, the low-frequency noise of about 80 Hz creates the sound 'DON', the middle-frequency noise of about 250 Hz creates the sound 'HOU', and the high-frequency noise of about 750 Hz creates the sound 'PATA'.

In order to reduce the "go-down" noise, the present inventor made many attempts to change the natural vibration of the tire by improving the internal structure thereof. However, when the sound pressure level at one peak was reduced, the others increased, and thus it was almost impossible to decrease all of the peaks.

The present inventor therefore, made a close analysis of the causes of the "go-down" noise, and found that the noise sound level is greatly affected by not only the magnitude of the shock when the tire contacts with the lower road level surface but also the flow speed of the air between the tire tread and road surface when the tire is separated from the road while rotating.

If the crown portion of the tread has a relatively large radius of curvature, the tread has a tendency to contact with the road surface at its edges first and then the tread crown follows. However the change in the ground contacting area from the beginning to the end of contact with the ground occurs in a very short period of time. Thus, the sound level of the "go-down" noise is high.

On the other hand, if the tread crown portion has a relatively small radius of curvature, the tread has a tendency to contact with the road surface in the tread crown portion first and then the edge portion follows. The change in the ground contacting area from the beginning to the end of ground contacting is relatively slow, and the "go-down" noise level is low.

However, if the radius of curvature of the crown part is simply decreased, uneven wear of the tread portion, such as heel-and-toe wear, polygonal wear and the like is liable to occur.

In Japanese laid-open patent application Nos. JP-A-4-87802 and JP-A-5-229308, a tire having a tread profile defined by three radii of curvature has been disclosed, wherein the radius of curvature decreases from the crown portion to the shoulder portion to improve the high speed steering stability. In such a profile however, the tire suffers from uneven wear.

In contrast, Japanese laid-open patent application No. JP-A-6-297912 discloses a motorcycle tire having a tread profile defined by three radii of curvature, wherein the three radii are set to be larger in the shoulder parts than the crown part and at a minimum in the middle parts so as to improve the cornering performance. This profile cannot be applied to a tire for four-wheel vehicles because it is designed for a motorcycle tire. In other words, a motorcycle tire is not intended by the present invention.

SUMMARY OF THE INVENTION

It is therefore, an object of the present invention to provide a pneumatic radial tire in which "the "go-down" noise" is reduced without increasing uneven wear.

According to one aspect of the present invention, a pneumatic radial tire comprises a tread portion, a pair of sidewall portions, a pair of bead portions, a pair of bead cores one disposed in each of the bead portions, a carcass extending between the bead portions through the tread portion and sidewall portions and turned up around the bead cores to be secured thereto, and a belt disposed radially outside the carcass and inside the tread portion, the tread portion having a profile comprising a curved crown part having a radius of curvature R1 and extending from the tire equator toward both sides thereof, a pair of curved middle parts having a radius of curvature R2 and each having an axial inner edge which is connected to one of the axial edges of the curved crown part without forming any inflection point therebetween, and a pair of curved shoulder parts having a radius of curvature R3 and each having an axial inner edge which is connected to the axial outer edge of the curved middle parts without forming any inflection point therebetween, each of the shoulder parts extending to or near the axial outermost edge of the ground contacting region, wherein the radius of curvature R1 of the curved crown part is in the range of from 2.0 to 3.5 times the tread width TW and is less than the radius of curvature R2 of the curved middle parts and more than the radius of curvature R3 of the curved shoulder parts, (R3<R1<R2) and the camber quantity T1 which is the radial distance of the tread profile at the tread edges from the tread profile at the tire equator is 0.038 to 0.050 times the tread width TW.

Here, the tread profile is defined as in a tire meridian section including the tire axis under an unloaded state in which the tire is mounted on a standard rim and inflated to a standard pressure and loaded with no tire load.

As the standard rim, the standard pressure and a standard load, those specified in a standard such as JATMA (Japan), TRA (USA), ETRTO (Europe) and the like for measuring the tire are used.

Preferably, the radius R2 of the middle parts is 5.0 to 7.5 times the tread width TW, and the radius R3 of the shoulder parts is 0.8 to 1.8 times the tread width TW.

Preferably, the axial width TW1 of the crown part is in the range of from 25 to 55% of the tread width TW, and the axial width TW2 of each of the middle parts is in the range of from 13 to 18% of the tread width TW, and the axial width TW3 of each of the shoulder parts is in the range of from 13 to 18% of the tread width TW.

BRIEF DESCRIPTION OF THE DRAWINGS

An embodiment of the present invention will now be described in detail in conjunction with the accompanying drawings, in which.

DETAILED DESCRIPTION OF THE INVENTION

Figure 1:
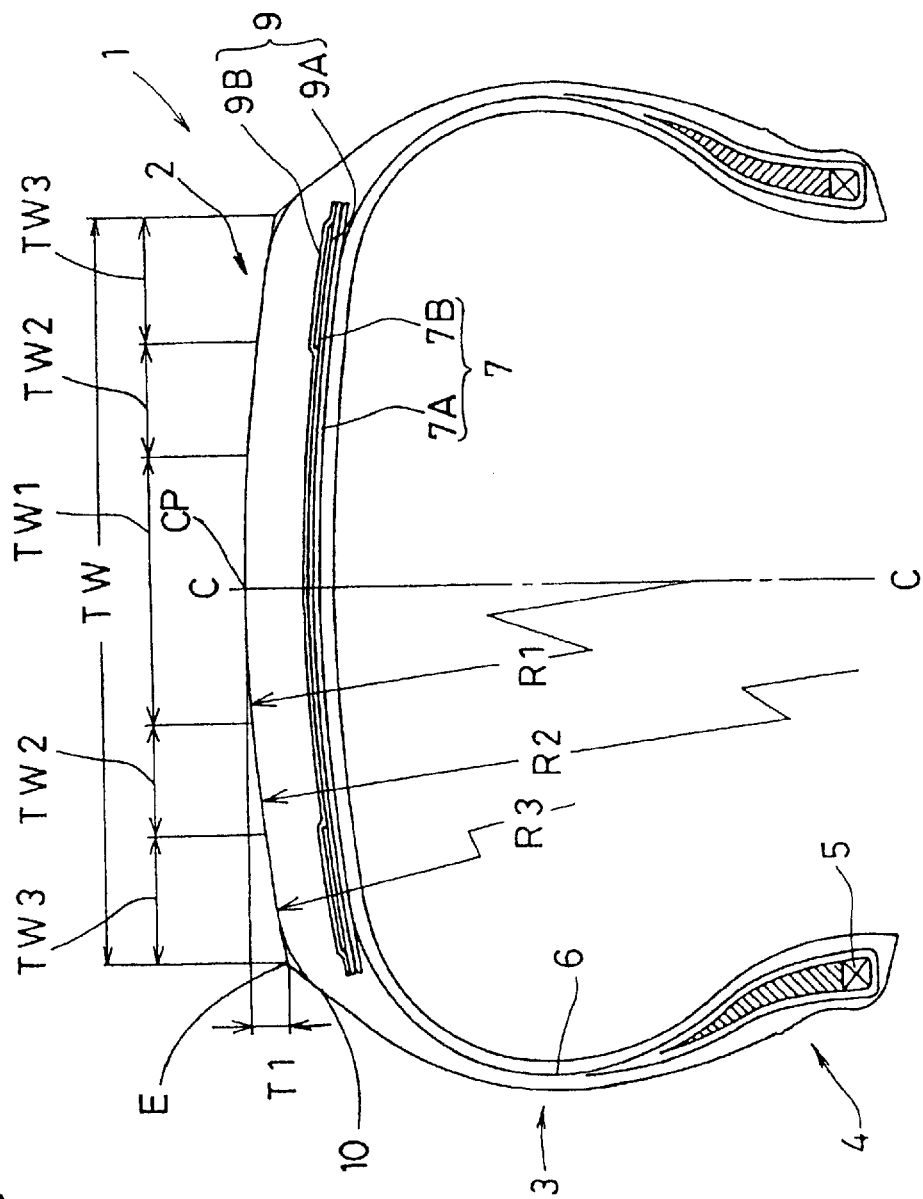
FIG. 1 is a cross sectional view of an embodiment of the present invention.

In FIG. 1, a pneumatic radial tire 1 according to the present invention comprises a tread portion 2, a pair of axially spaced bead portions 4, a pair of sidewall portions 3 extending between the tread edges E and the bead portions 4, a pair of bead cores 5, each disposed in each of the bead portions 4, a carcass 6 extending between the bead portions 4 through the tread portion 2 and sidewall portions 3 and turned up around the bead cores 5 to be secured thereto, and a belt disposed radially outside the carcass and inside the tread.

In FIG. 1, the tire 1 is a tire for passenger cars having an aspect ratio of not more than 0.8. (Tire size: 195/65R15, Aspect ratio: 0.65)

The carcass 6 comprises at least one ply, in this embodiment only one ply, of cords arranged radially at an angle of from 90 to 75 degrees with respect to the tire equator C.

For the carcass cords, organic fiber cords, e.g. polyester cords, nylon cords, rayon cords and the like are preferably used. However, steel cords also may be used depending on the use of the tire.

The belt in this example comprises a breaker 7 disposed on the radially outside of the carcass and a band 9 disposed radially outside the breaker 7.

The breaker 7 is composed of at least two plies 7A and 7B each made of parallel cords laid at an angle of from 15 to 30 degrees to the tire equator C so as to cross the cords of the next ply.

For the breaker cords, steel cords are preferably used, but organic fiber cords, e.g. aramid cords, nylon cords, polyester cords, rayon cords and the like can be used.

The band 9 is made of one or more organic fiber cords laid substantially parallel to the circumferential direction of the tire.

In this example, the band 9 is composed of a full-width band 9B and a pair of axially spaced edge bands 9A.

The full-width band 9B is disposed on the radially outside of the breaker 7 and extends over the entire width thereof so as to cover the radially outside of the breaker 7.

The edge bands 9A are disposed on the radially outside of the full-width band 9B so as to cover only the breaker edge portions.

For the band cords, nylon cords are used in this example, but polyester cords, rayon cords, aromatic polyamide cords and the like may be used.

The tread portion 2 is provided with a tread profile comprising curved parts TW1, TW2 and TW3 having different radii R1, R2 and R3 of curvature.

A crown part TW1 which has a radius of curvature R1 extends from the tire equator CP toward both sides thereof.

A pair of middle parts TW2 which have a radius of curvature R2 extend axially outwardly from the axial edges of the crown part.

A pair of shoulder parts TW3 which have a radius of curvature R3 extend axially outwardly from the axial outer edges of the middle parts to the axial outermost edge of the ground contacting area.

These parts are connected to each other without forming any inflection point.

The radius of curvature R1 of the crown part is set to be less than the radius of curvature R2 of the middle parts and more than the radius of curvature R3 of the shoulder parts. (R3<R1<R2)

The radius of curvature R1 of the crown part is set in the range of from 2.0 to 3.5 times the tread width TW, more preferably 2.0 to 3.0 times, and still more preferably 2.0 to 2.7 times TW. Such radius R1 is very small in a passenger tire.

If the radius R1 is more than 3.5 times TW, the "go-down" noise is not reduced. If the radius R1 is less than 2.0 times TW, the ground pressure in the crown part becomes higher than the other parts and the crown part wear is accelerated.

Further, the camber quantity T1 which is the radial distance between the tread profile at the tire equator CP and tread edge E is set in the range of from 0.038 to 0.050 times the tread width TW so as to minimize variation of the tire diameter in the ground contacting region.

If the camber quantity T1 is more than 0.050 times the tread width TW, uneven wear such as heel/toe wear of tread elements (blocks) increases. If the camber quantity T1 is less than 0.038 times TW, the noise becomes worse.

Such a small camber quantity is realized by the contribution of the middle parts whose radius R2 is largest in the three parts. As a result, uneven wear can be prevented.

Due to the combination of the very small radius R1 of the crown part, the relationship R2>R1>R3, and the specifically limited camber quantity T1, when traversing a level road, the crown part contacts the road surface first and the ground contacting area gradually increases. As a result, the "go-down" noise can be reduced, and further uneven wear of the tread rubber can be decreased.

The axial width TW1 of the crown part is set in the range of from 25 to 55%, more preferably 30 to 40% of the tread width TW.

If TW1 is less than 25% TW, the crown part cannot display its function and the ground contacting behavior is not gradual. If TW1 is more than 55% TW, it becomes difficult to set the camber quantity T1 at a small value, and uneven wear is liable to occur.

In order to limit the camber quantity T1 in the above-mentioned range and to make the going-down behavior change gradually while controlling uneven wear, the radius of curvature R2 of the middle parts is set in the range of from 5.0 to 7.5 times, preferably 5.3 to 7.0 times, more preferably 5.3 to 6.7 times the tread width TW, and the axial width TW2 of the middle part is preferably set in the range of from 13 to 18% of the tread width TW.

In order to smoothly discharge the air existing between the tire and the road surface towards the axial outside of the tire, the radius of curvature R3 of the shoulder parts is set in the range of from 0.8 to 1.8 times, preferably 1.0 to 1.4 times the tread width TW, and the axial width TW3 of the shoulder parts is preferably set in the range of from 13 to 18% of the tread width TW.

If the ratio R3/TW is set in the range of from 0.8 to 1.8 and the ratio R2/TW is in the range of from 5.0 to 7.5, it is possible to set the ratio T1/TW in the range of from 0.038 to 0.050. In this case, however, the air discharge is not gradual, and the noise cannot be reduced. Further, as the middle parts between the crown part and the shoulder parts have a smaller radius of curvature, the steering stability, especially at a transitional stage of cornering, is lowered.

The above-mentioned tread width TW is the axial width of the tread portion 2.

Figure 3:
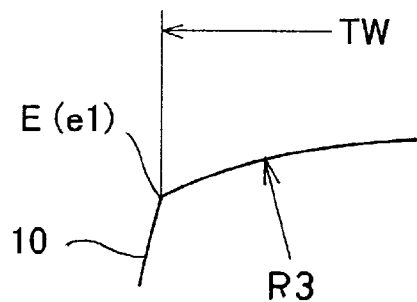
FIG. 3 is a schematic cross-sectional view showing a square shoulder.

In a square shoulder having angled tread edges E as shown in FIG. 3, the tread width TW is defined between the angled tread edges E.

In this case, the shoulder part of the radius R3 extends to the tread edge E which may be the axial outermost edge (e1) of the ground contacting area.

Figure 4:
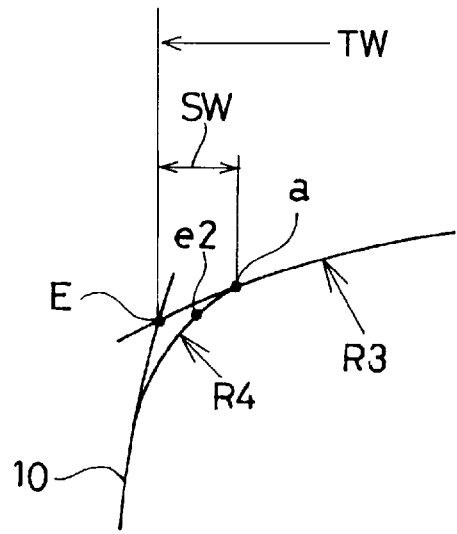
FIG. 4 is a schematic cross-sectional view showing a round shoulder.
Figure 5:
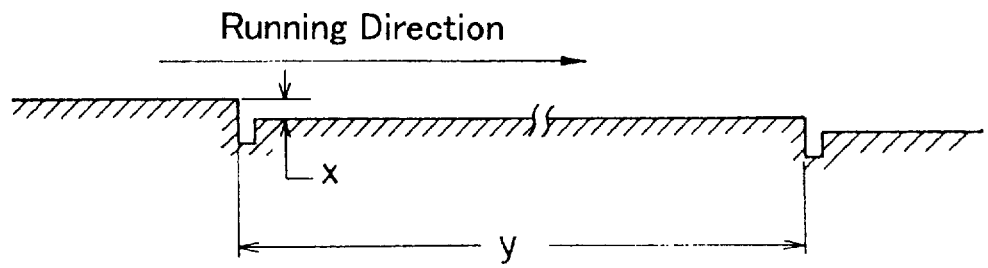
FIG. 5 is a schematic cross-sectional view showing a difference in road level.

In a round shoulder as shown in FIG. 4, the tread width TW is defined between imaginary tread edges E. As is well known in the art, the imaginary tread edge E is an intersecting point of an extended line of the shoulder part profile line and an extended line of the profile line of the buttress part 10 (upper sidewall part).

In this case, the radius of curvature R4 of the rounded tread edge part is set to be less than the radius of curvature R3 and to be not more than 0.5 times, more preferably 0.3 times the tread width TW.

If the ratio R4/TW is more than 0.5, the ground contacting width decreases, and the steering stability and wear resistance are liable to become worse.

The rounded edge part is connected to the axially outer edge (a) of the shoulder part without forming any inflection point therebetween, whereby the axial outermost edge (e2) of the ground contacting area may be axially outwards of the axially outer edge (a) of the shoulder part.

The axial distance SW between the imaginary tread edge E and the axially outer edge (a) is preferably set in the range of not more than 0.5 times, more preferably not more than 0.4 times the axial width TW3 of the shoulder part. If the SW/TW3 ratio is more than 0.5 times, the ground contacting width decreases which causes a deterioration the steering stability and wear resistance.

The ground contact area of the tire is defined as a tire which is mounted on a standard rim and inflated to a standard inner pressure and loaded with a standard tire load.

Comparison Tests

Test tires of size 195/65R15 were made be way of test. The test tires were provided with the same tread pattern shown in FIG. 2 but various profiles by hand cutting slick tires.

Figure 2:
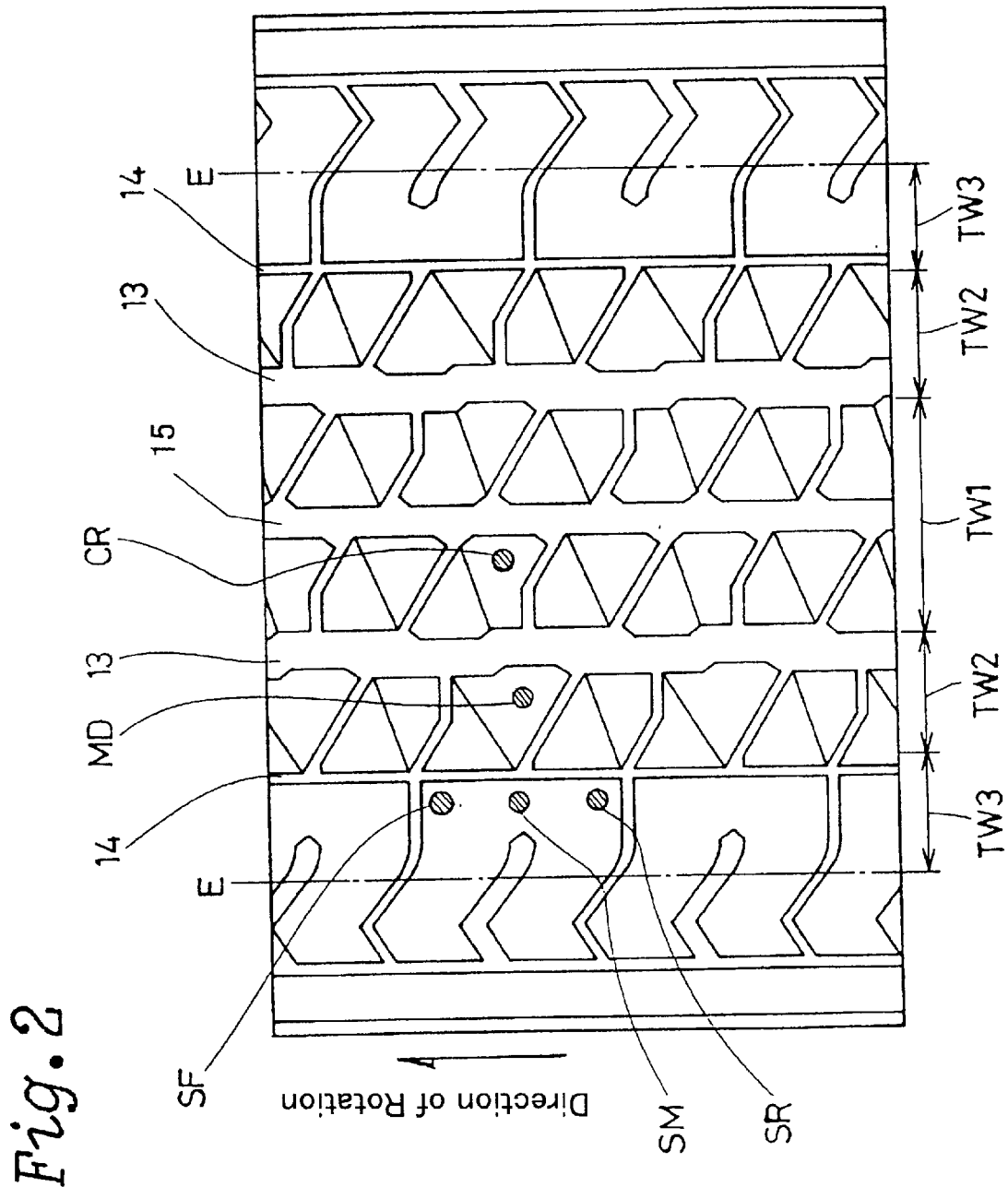
FIG. 2 shows an example of the tread pattern used in the embodiment of FIG. 1.

In the tread pattern of FIG. 2, a central wide circumferential groove 15 extends along the tire equator, a pair of wide circumferential grooves 13 are disposed immediately outside the boundary of the crown part TW1 and middle parts TW2 within a 10 mm range from the boundary, a pair of narrow circumferential grooves 14 are also disposed immediately outside the boundary of the middle parts TW2 and shoulder parts TW3 within a 10 mm range from the boundary.

The test tires were tested for the go-down noise and uneven wear.

(1) Go-down noise test

Running Bakersfield Freeway #99 in California USA, the maximum sound pressure level of the go-down noise at a running speed of 60 mph was measured in a low-frequency band (40 to 100 Hz), middle-frequency band (200 to 260 Hz) and high-frequency band (600 to 860 Hz), using a microphone set near the headrest of the driver's seat.

Figure 6A:
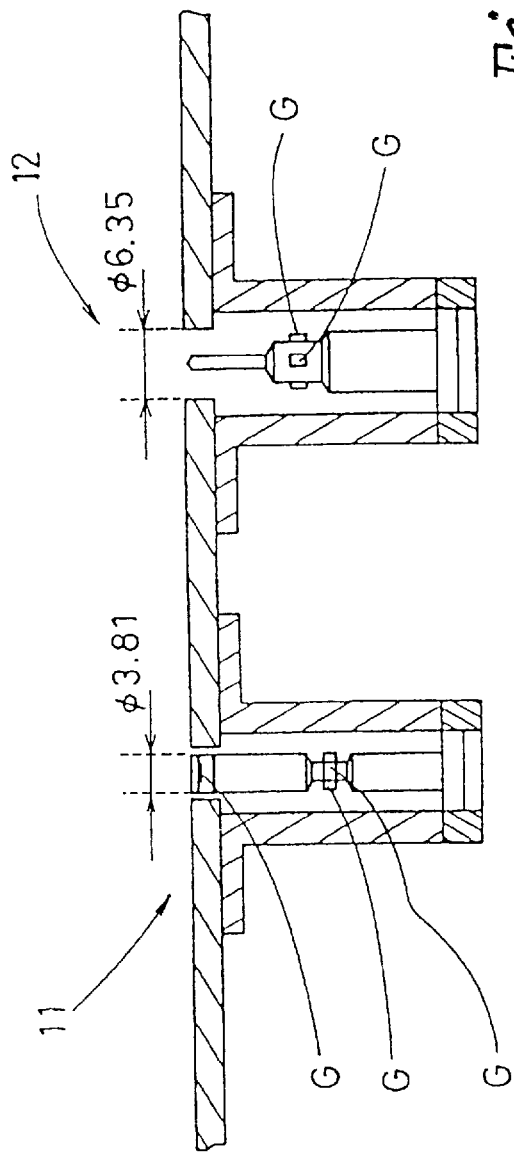
FIG. 6A is a schematic cross-sectional view showing a wear energy measuring device.
Figure 6C:
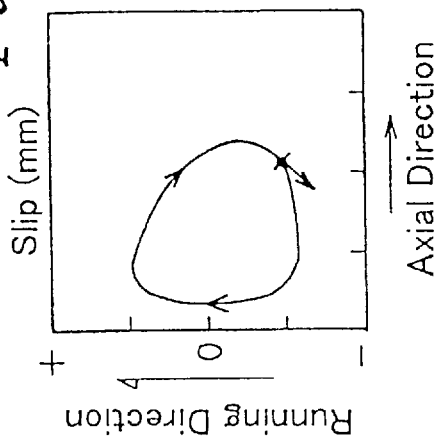
FIG. 6C represents a measurement of the slip from entering the ground contacting area to leaving the ground contacting area from which wear energy can be determined.
Figure 6B:
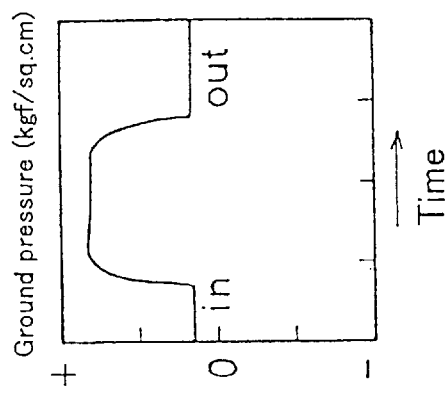
FIG. 6B represents a measurement of ground pressure from which wear energy can be determined.

Test car: ACCORD LX
Wheel Rim: 15×5.5JJ
Air pressure: Front 2.2 kgf/sq.cm
Rear 2.2 kgf/sq.cm (2) Uneven wear test Using a wear energy measuring device made up of a triaxial stress sensor 11 having strain gauges G and a slip sensor 12 as shown in FIG. 6, the ground pressure and the amount of slip was measured, from which the wear energy at many points CR in the crown part, MD in the middle parts, SF, SM, SR in the shoulder parts as shown in FIG. 2 was obtained by means of calculation.

The wear energy can be obtained by integrating the product (PXS) of the ground pressure P and the amount of slip S from entering the ground contacting area to leaving the ground contacting area. When the wear energy is even at the measuring points SF, SM and SR, especially SF and SR, the heel and toe wear decreases.

When the wear energy is even between the points CR and MD, uneven wear in the tire axial direction such as crown wear and shoulder wear is decreased.

The tire load in the vertical direction was 450 kgf. The slip angle was zero and the camber angle was also zero. The test results are shown in Table 1.

From the test results, it was confirmed that, in comparison with the reference tire 2, the example tires 1, 2 and 3 were improved in the peak sound level at about 80, 250 and 750 Hz of the go-down noise, and at the same time the wear energy was evened in both the axial and circumferential directions.

Further, as the air between the tread and road surface can be smoothly discharged, the water existing between the tread and road surface is also discharged effectively. Thus the tires according to the present invention are also superior in the aquaplaning performance.

TABLE 1

| Test Tire | Ex. 1 | Ex. 2 | Ex. 3 | Ref. 1 | Ref. 2 | Ref. 3 | Ref. 4 | Ref. 5 |
| --- | --- | --- | --- | --- | --- | --- | --- | --- |
| Crown part | | | | | | | | |
| Radius R1 (mm) | 450 | 300 | 525 | 250 | 800 | 300 | 525 | 525 |
| Width TW1 (mm) | 50 | 50 | 50 | 50 | 50 | — | — | 50 |
| R1/TW | 3.0 | 2.0 | 3.5 | 1.7 | 5.3 | 2.0 | 3.5 | 3.5 |
| TW1/TW | 0.33 | 0.33 | 0.33 | 0.33 | 0.33 | — | — | 0.33 |

TABLE 1-continued

| Test Tire | Ex. 1 | Ex. 2 | Ex. 3 | Ref. 1 | Ref. 2 | Ref. 3 | Ref. 4 | Ref. 5 |
|---|---|---|---|---|---|---|---|---|
| Middle part | | | | | | | | |
| Radius R2 (mm) | 800 | 1000 | 800 | 800 | 800 | 300 | 525 | 400 |
| Width TW2 (mm) | 25 | 25 | 25 | 25 | 25 | — | — | 25 |
| R2/TW | 5.3 | 6.7 | 5.3 | 5.3 | 5.3 | 2.0 | 3.5 | 2.7 |
| TW2/TW | 0.16 | 0.16 | 0.16 | 0.16 | 0.16 | — | — | 0.16 |
| Shoulder part | | | | | | | | |
| Radius R3 (mm) | 150 | 260 | 200 | 200 | 200 | 300 | 525 | 800 |
| Width TW3 (mm) | 25 | 25 | 25 | 25 | 25 | — | — | 25 |
| R3/TW | 1.0 | 1.7 | 1.3 | 1.3 | 1.3 | 2.0 | 3.5 | 5.3 |
| TW3/TW | 0.16 | 0.16 | 0.16 | 0.16 | 0.16 | — | — | 0.16 |
| Tread edge | | | | | | | | |
| Radius R4 (mm) | 20 | 20 | 20 | 20 | 20 | 20 | 20 | 20 |
| R4/TW | 0.13 | 0.13 | 0.13 | 0.13 | 0.13 | 0.13 | 0.13 | 0.13 |
| Camber T1 (mm) | 6.5 | 7.5 | 5.7 | 9.1 | 4.7 | 9.5 | 5.4 | 5.7 |
| T1/TW | 0.043 | 0.050 | 0.038 | 0.061 | 0.031 | 0.063 | 0.036 | 0.038 |
| Noise level (dB) | | | | | | | | |
| Low-freq. | 63.9 | 63.2 | 65.3 | 63.0 | 66.5 | 63.7 | 66.9 | 66.8 |
| Middle-freq. | 67.2 | 66.1 | 68.1 | 66.0 | 68.3 | 66.5 | 68.4 | 68.3 |
| High-freq. | 61.2 | 59.7 | 62.3 | 59.1 | 63.5 | 59.8 | 63.9 | 64.3 |
| Wear energy (kgf · mm/sq. cm) | | | | | | | | |
| Point CR | 0.39 | 0.44 | 0.37 | 0.60 | 0.29 | 0.49 | 0.36 | 0.35 |
| Point MD | 0.37 | 0.36 | 0.39 | 0.31 | 0.43 | 0.20 | 0.27 | 0.19 |
| Point SF | 0.30 | 0.28 | 0.32 | 0.15 | 0.19 | 0.31 | 0.52 | 0.49 |
| Point SM | 0.33 | 0.32 | 0.34 | 0.22 | 0.21 | 0.48 | 0.61 | 0.67 |
| Point SR | 0.39 | 0.40 | 0.38 | 0.42 | 0.25 | 0.72 | 0.69 | 0.78 |
| Maximum | 0.39 | 0.44 | 0.39 | 0.60 | 0.43 | 0.72 | 0.69 | 0.78 |
| Minimum | 0.30 | 0.28 | 0.32 | 0.15 | 0.19 | 0.20 | 0.27 | 0.19 |
| Difference | 0.09 | 0.16 | 0.07 | 0.45 | 0.24 | 0.52 | 0.42 | 0.59 |

Tread width TW = 150 mm
Ground contacting width = 136 mm

I claim:

1. A pneumatic radial tire comprising
a carcass extending between bead portions through a tread portion and sidewall portions and
a belt disposed radially outside the carcass and inside the tread portion,
the tread portion, when the tire is mounted on a standard rim and inflated to a standard pressure and loaded with no tire load, having a tread axial width TW and a profile comprising
a curved crown part having a radius of curvature R1 and an axial width TW1 and extending from the tire equator toward both sides thereof,
a pair of curved middle parts having a radius of curvature R2 and each having an axial width TW2 and an axially inner edge which is connected to one of the axial edges of the curved crown part without forming any inflection point therebetween, and
a pair of curved should parts having a radius of curvature R3 and each having an axial width TW3 and an axially inner edge which is connected to the axially outer edge of one of the curved middle parts without forming any inflection point therebetween, each of the shoulder parts extending to or near an axially outermost edge of the ground contacting region of the tread portion, wherein
the radius of curvature of R1 of the curved crown part is in the range of from 2.0 to 3.5 times the tread width TW and is less than the radius of curvature R2 of the curved middle parts and more than the radius of curvature R3 of the curved shoulder parts, and
the camber quantity T1, which is the radial distance of the tread profile at the tread edges from the tread profile at the tire equator is 0.038 to 0.050 times the tread width TW.

2. The pneumatic radial tire according to claim 1, wherein the axial width TW1 of the crown part is in the range of from 25 to 55% of the tread width TW, and
the axial width TW2 of each of the middle parts is in the range of from 13 to 18% of the tread width TW, and
the axial width TW3 of each of the shoulder parts is in the range of from 13 to 18% of the tread width TW.

3. The pneumatic radial tire according to claim 1, wherein the radius R2 of the middle parts is 5.0 to 7.5 times the tread width TW, and
the radius R3 of the shoulder parts is 0.8 to 1.8 times the tread width TW.

4. The pneumatic radial tire according to claim 3, wherein the axial width TW1 of the crown part is in the range of from 25 to 55% of the tread width TW, and the axial width TW2 of each of the middle parts is in the range of from 13 to 18% of the tread width TW, and the axial width TW3 of each of the shoulder parts is in the range of from 13 to 18% of the tread width TW.

* * * * *